D. W. WHITAKER.
RAKE.
APPLICATION FILED SEPT. 22, 1915.
1,191,378.
Patented July 18, 1916.
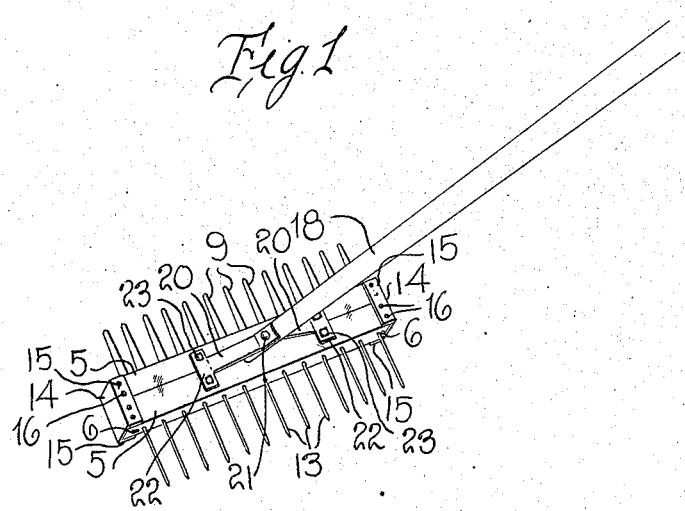
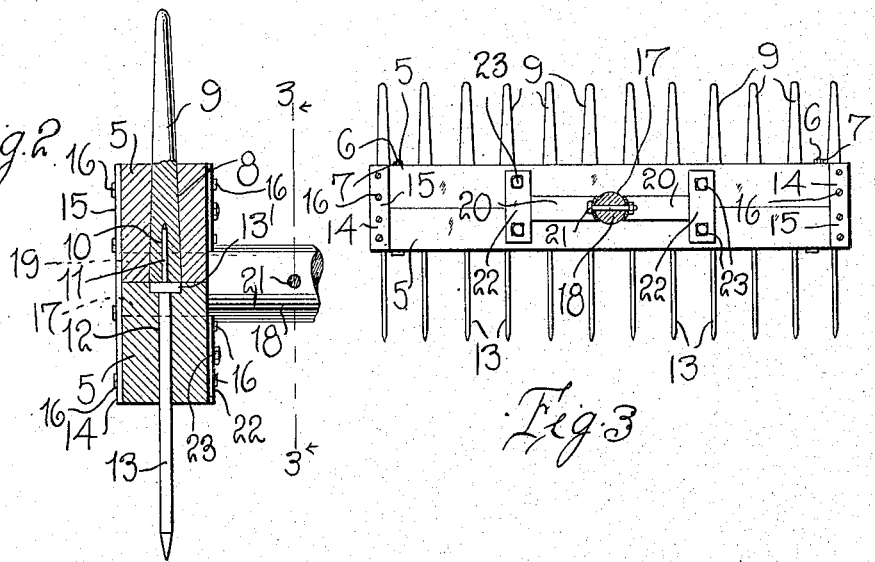
Inventor
DAVID W. WHITAKER
By Watson E. Coleman
Attorney

UNITED STATES PATENT OFFICE.

DAVID W. WHITAKER, OF OAK RIDGE, NORTH CAROLINA.

RAKE.

1,191,378. Specification of Letters Patent. Patented July 18, 1916.

Application filed September 22, 1915. Serial No. 52,051.

*To all whom it may concern:*

Be it known that I, DAVID W. WHITAKER, a citizen of the United States, residing at Oak Ridge, in the county of Guilford and State of North Carolina, have invented certain new and useful Improvements in Rakes, of which the following is a specification, reference being had to the accompanying drawings.

This invention relates to an improved rake and has for its primary object to provide in one implement what is in effect, two separate rakes which may be serviceably employed for distinct and different purposes.

The invention has for a more particular object to provide a rake consisting of two head bars, one of which is adapted to carry a series of wooden teeth or tines and the other a series of metal teeth, bolts securing the bars together at their ends, and an improved handle brace which also serves as an additional connecting means between the head bars.

The invention has for still another object to provide means on the ends of the head bars for connecting and reinforcing the same and preventing the bars from being longitudinally split in the use of the rake.

With the above and other objects in view, my invention consists in the novel features of construction, combination, and arrangement of parts to be hereinafter more fully described, claimed, and illustrated in the accompanying drawing, in which—

Figure 1 is a perspective view illustrating the preferred embodiment of my improved rake; Fig. 2 is a fragmentary vertical longitudinal section through the rake head, showing the manner of mounting the teeth in the bars of said head; Fig. 3 is a vertical section taken at right angles to Fig. 2, showing the manner of connecting the handle braces to the head bars.

Referring in detail to the drawing, 5 designates two rectangular head bars which are adapted to be arranged in superposed relation, as shown. These bars are each bored adjacent to their corresponding ends and through the coinciding openings, thus formed, connecting bolts 6 are adapted to be inserted. The lower ends of these bolts are preferably angularly turned, while upon the upper ends thereof, nuts 7 are adapted to be threaded.

One of the head bars 5 is formed with a plurality of spaced openings 8, which have a slight longitudinal taper and are adapted to receive the butt ends of the tapering wooden rake teeth 9. These butt ends of the rake teeth are bored longitudinally for a short distance to provide the pin receiving sockets 10 into which the wedge pins 11 are adapted to be driven. These pins split or spread the ends of the rake teeth into tight frictional binding engagement with the walls of the openings 8. Thus the teeth will be absolutely tight in the head bar and prevented from working out of the openings 8. The other of the head bars 5 is also provided with a series of spaced openings 12 in opposed relation to the openings 8 and these openings 12 are adapted to receive the metal rake teeth 13. These teeth are preferably of heavy nail wire, corresponding to the commercial twenty penny nail and the openings 12 are circumferentially enlarged at one of their ends to receive the heads 13' of said teeth. When the bars 5 are assembled in superposed relation, the heads of the metal teeth 13 abut against the ends of the wooden rake teeth 9.

For the purpose of obviating liability of spliting the head bars 5 at their ends, I provide the sheet iron plates 14 formed with the longitudinal flanges 15 to extend upon the corresponding side faces of the head bars. These flanges are perforated to receive suitable fastening screws, indicated at 16.

The head bars 5 are each provided in their opposed faces with one-half of a socket 17, which receives the reduced end 19 of the handle 18.

20 designates the obliquely disposed metal brace bars which are fixed at one of their ends by means of the connecting bolt 21 to the handle 18 at a point in spaced relation to the rake head. The other or outer end of each brace bar is formed with a T-shaped terminal 22 which is engaged upon the inner side of the rake head and extends upon the faces of the two bars 5. Bolts 23 are disposed through the ends of the T-shaped terminals of the braces and through co-inciding transverse openings formed in the rake bars 5. Thus an effective brace is provided for the handle of the rake and the transverse bolts 23 disposed through the bars 5 further act to prevent spliting of said bars.

It will be seen from the above description that there is provided three distinct connecting means between the bars 5, namely the connecting bolts 6, the metal protecting caps 14 and the braces 20, so that said bars are absolutely held against any relative shifting movement. By the provision of the metal and wooden rake teeth, projecting from opposite sides of the head, the rake may be inverted when one or the other set of rake teeth might be most advantageously utilized for the particular purpose in contemplation.

From the foregoing description taken in connection with the accompanying drawings, it is believed that the construction and several advantages of my improved rake will be clearly and fully understood. Should any of the metal rake teeth 13 become bent, they can be readily straightened or removed from the head bar 5 and replaced by new teeth. The bars constituting the rake head can be readily assembled or disassembled and when clamped together, constitute what is in effect, a single head-piece in which the two series of rake teeth are set. The several parts employed in the construction of the rake are all very simply formed and it will, therefore, be appreciated that the device can be manufactured at comparatively small cost.

While I have shown and described the preferred construction and arrangement of the several parts of my improved rake, it is to be understood that the device is susceptible of considerable modifications and I therefore reserve the privilege of resorting to all such legitimate changes as may be fairly embodied within the spirit and scope of the invention, as claimed.

Having thus described this invention, what I desire to claim as new and secure by Letters Patent, is:—

1. A rake including a head, consisting of two rectangular bars arranged in longitudinal parallel relation to each other, each provided with a series of teeth receiving openings, a series of metal rake teeth arranged in the openings of one bar, a series of wooden rake teeth arranged in the openings of the other bar, connecting bolts disposed through the head bars adjacent their ends to clamp the same together, and metal cap plates extending around the ends of the head bars and secured thereto.

2. A rake including a head, consisting of two rectangular bars, each provided with a series of teeth receiving openings, a series of metal rake teeth arranged in the openings of one bar, and a series of wooden rake teeth arranged in the openings of the other bar, the ends of the corresponding metal and wooden rake teeth being in abutting engagement, connecting bolts disposed through the head bars adjacent their ends to clamp the same together, metal cap plates extending around the ends of the head bars and secured thereto, a handle, obliquely disposed bracing irons connected at one of their ends to the handle in spaced relation to the rake head, and transversely disposed bolts extending through the other ends of said irons and through each of the head bars.

3. A rake including a head consisting of two bars, each having a series of teeth receiving openings, wooden teeth arranged in the openings of one of said bars, and metal teeth arranged in the openings of the other of the bars, said teeth projecting in relatively opposite directions from the respective head bars, clamping bolts disposed through the head bars adjacent their opposite ends, a handle, obliquely disposed bracing irons fixed at one of their ends to the handle in spaced relation to the rake head, and bolts connecting the other ends of the bracing irons to each of the head bars and extending through said bars in a plane at right angles to said clamping bolts.

In testimony whereof I hereunto affix my signature in the presence of two witnesses.

DAVID W. WHITAKER.

Witnesses:
Z. L. WHITAKER,
E. F. MAYBERRY.

Copies of this patent may be obtained for five cents each, by addressing the "Commissioner of Patents, Washington, D. C."